3,639,670
4-PHENYLAMINO-3-NITRO BENZENE N-(3-ACETYLPHENYL) SULFONAMIDES
Andrew Fono, Montclair, and Robert E. Eagle, Metuchen, N.J., assignors to Otto B. May, Inc., Newark, N.J.
No Drawing. Filed Mar. 10, 1969, Ser. No. 805,862
Int. Cl. C07c *143/80*
U.S. Cl. 260—397.7 R  6 Claims

ABSTRACT OF THE DISCLOSURE

This disclosure relates to certain new dye compounds which are 4 - arylamino - 3 - nitrobenzene-N-(3-acetylphenyl)-sulfonamides. This disclosure also relates to polyester-containing shaped articles, e.g., fibers, dyed with these compounds.

---

It is known to dye polyester shaped articles, such as Dacron fibers, with 4 - phenylamino - 3-nitrobenzene-N-phenyl-sulfonamide (Disperse Yellow 42). However, this dye shows excessive sublimation which is damaging to equipment and which causes problems in the finishing operations. Furthermore, this dye has poor build properties. Attempts have been made to improve the sublimation fastness by modifying the dye structure but this has had a more deleterious effect on the build properties. In other words, the modified dyes did not provide desirable deep shades.

According to the present invention, it has been discovered that certain substituted sulfonamides are suitable for dyeing polyester shaped articles to provide products having excellent build properties, i.e., deep shades with outstanding fastness to sublimation and light. These substiuted sulfonamides are described by the following generic structure:

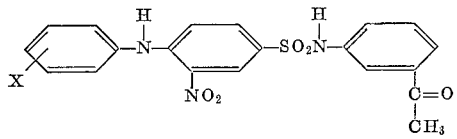

wherein X is hydrogen, halogen, lower alkyl or lower alkoxy.

The aforementioned substituted sulfonamide dyes may be prepared by any suitable method. One method is to heat at 125° C. for several hours a 4-halo-3-nitrobenzene-N-(3-acetylphenyl)-sulfonamide in an aqueous slurry with a slight molar excess of a suitable primary arylamine. The following primary arylamines, among others, may be employed in this reaction: aniline, o-toluidine, m-toluidine, p-toluidine, o-ethylaniline, m-ethylaniline, p-ethylaniline, o-propylaniline, m-propylaniline, p-propylaniline, o-butylaniline, m-butylaniline, p-butylaniline, o-amylaniline, m-amylaniline, p-amylaniline, o-hexylaniline, m-hexylaniline, p-hexylaniline, o-chloroaniline, m-chloroaniline, p-chloroaniline, o-bromoaniline, m-bromoaniline, p-bromoaniline, o-fluoroaniline, m-fluoroaniline, p-fluoroaniline, o-methoxyaniline, m-methoxyaniline, p-methoxyaniline, o-ethoxyaniline, m-ethoxyaniline, p-ethoxyaniline, o-propoxyaniline, m-propoxyaniline, p-propoxyaniline, o-butoxyaniline, m-butoxyaniline, p-butoxyaniline, o-amoxyaniline, m-amoxyaniline, p-amoxyaniline, o-hexoxyaniline, m-hexoxyaniline, and p-hexoxyaniline.

A finely dispersed paste may be formed from the dyes of this invention, for example, by milling in the presence of a dispersing agent; or by dissolving in dimethylformamide, drowning in water and filtering in the presence of a dispersing agent; or by dissolving in 93% sulfuric acid at 5 to 10° C., drowning into ice, filtering in the presence of a dispersing agent and washing.

Synthetic fibers and other shaped articles are formed from polyesters which are well known in the art (U.S. Pat. Nos. 2,465,319; 2,901,466; 3,341,277 which are incorporated herein by reference). As stated in Encyclopedia of Chemical Technology, vol. 13, pgs. 840–6 (1954), which is also incorporated herein by reference, polyester fibers are made from high polymers that are condensation products of alcohols and organic acids or of hydroxy acids. This includes, among others, the condensation products of polybasic acid or esters thereof with polybasic alcohols, e.g., polyethylene terephthalate (Dacron), and products of p,p'-sulfonyldibenzoic acid or terephthalic acid with 1,4-cyclohexanedimethanols.

In the present invention, the polyesters can be used alone. However, a composite shaped article, e.g., fabric, can be also formed by mixing polyesters with one or more natural or synthetic materials. This includes, among others, the following: polyolefins, such as polypropylene and polyethylene; polyamides, such as nylon, polymers of acrylic acid compounds, such as acrylonitrile; polymers of vinyl compounds, such as vinyl alcohol, vinyl chloride and styrene; polyacetals, such as polyformaldehyde, and cellulose triacetate; cotton; wool; silk and mixtures thereof. The range of the polyesters in the shaped articles is generally about 20% to about 100%, e.g., 25% to 65%. Preferred composite fabrics are blends of polyester-cotton, polyester-rayon and polyester-cotton-rayon.

Synthetic shaped articles are formed from the aforementioned polyesters in accordance with known prior art procedures. A fiber is defined herein as any fibrous unit, for instance, filament yarns, mats, staple yarns, rovings, sheets, rods, plates, woven fabrics and chopped fibers.

The substituted sulfonamide dye compound heretofore described forms the basis of an aqueous dye bath into which the fibers are immersed. Since the dyes are insoluble in water, they must be dispersed in the bath. Any known dyeing techniques may be employed in this invention to provide a dyed fiber, including, among others, the methods discussed and referenced in the article by Fortess, Advances in Textile Processing, vol. 1, pages 333–373.

For instance, the dyeing of fibers formed from terephthalate polyesters may be carried out by working the fibers in a dyebath containing a dispersion of one or more of the dye compounds of the invention and generally also containing a dyeing assistant, such as phenol, orthophenylphenol, chlorobenzene, benzoic acid, salicylic acid, biphenyl or mixtures thereof. The dyeing operation may be carried out at about 80° C. to 115° C. and preferably at about the boiling temperature. By using a closed apparatus, the dyeing operation can be performed at superatmopsheric pressures and at temperatures above the boiling point at atmospheric pressure. More information on specific dyeing methods is disclosed in the following which are incorporated herein by reference: U.S. Pat. No. 2,833,613; British Pat. Nos. 609,943 and 609,944; Australian Pat. No. 13,884; Principles of Dyeing Dacron Polyester Fiber, American Dyestuff Reporter, 41 (1952), 860; Thermosol Method of Dyeing, American Dyestuff Reporter, 42 (1953), 1; Dyeing of Dacron Polyester Fiber—Evaluation of Dyeing Assistants, Du Pont Technical Bulletin, volume 8, No. 2 (June 1952), page 69.

A suitable method for dyeing a polyester-cotton fabric for preparing press-free, crease-retaining garments (U.S. Pat. Nos. 2,974,432 and 3,268,915 which are incorporated herein by reference) is to pass the fabric through an aqueous dispersion of the aforementioned dye of the invention and to squeeze the fabric between closely set rollers to remove excess dye liquor. The dye, which is only loosely attached to the fabric, is subsequently fixed thereon by subjecting it to a short, intensive heat treatment at elevated temperatures, e.g., 120° to 220° C. The dyed fabric therefrom is padded with an aqueous solution containing a polymerizable resin and a catalyst with other optional ingredients, such as a softener, a hand modifier, a water repellent, a gum, a wetting solution and the like and it is then dried at a temperature below the polymerization temperature of the resin. After the dried, treated fabric is cut, sewed, finished and pressed, the resulting garment is placed in an oven at elevated temperatures to cure the resin.

Any suitable water-soluble polymerizable resin, e.g., a thermosetting resin, can be employed to form the aforementioned press-free, crease-retaining garments. This includes among others, the urea-formaldehyde resins, melamine-formaldehyde resins and urea-formaldehyde-glyoxal resin disclosed in U.S. Pat. Nos. 2,974,432, 3,049,446 and 3,268,915 which are incorporated herein by reference. Any suitable catalyst required for curing the resin can also be employed.

The amount of dye employed in the present invention depends upon the depth of coloring desired. For example, when a polyethylene terephthalate fiber is used the amount of dye may range from about 0.1% to about 20% by the weight of the fiber.

Thus, in accordance with this invention, dye compounds have been formed which can be applied to polyester shaped articles. These dyed articles have excellent fastness to light, washing, heat and sublimation. Furthermore, the dyed articles have bright yellow to orange shades both in light and heavy depth. The compounds of the invention also have good stability in the dyebath. They can be readily applied by the known procedures from a dyebath in the presence of a carrier and are free of any color stain at the metal to dyebath interface.

The following examples are submitted to illustrate but not to limit this invention. Unless otherwise indicated, all parts and percentages in the specification and claims are based upon weight.

EXAMPLE I

A mixture of 73.4 parts m-amino acetophenone, 250 parts water, 50 parts ice, 48 parts sodium carbonate and 3 parts lignin sulfonate was thoroughly dispersed in a high speed mixer (Waring Blendor). To this mixture was added 167 parts (pure dry basis) 1-chloro-2-nitro-4-benzene sulfonylchloride. The mixture was blended for one minute and then transferred to a beaker and stirred overnight. The resultant slurry of grey crystals was filtered, washed free of chloride ions with cold water and removed as a paste. The resulting product was 4-chloro-3-nitrobenzene-N-(3-acetylphenyl)-sulfonamide with a melting point of 130–134° C. The yield was 183 parts (dry basis).

Into an autoclave was charged 127.2 parts (dry basis) of the aforementioned sulfonamide compound, 240 parts water, 6 parts lignin sulfonate, 40 parts aniline and 42 parts soda ash. The slurry therefrom was heated under pressure to 125° for 3–4 hours and was then poured into 1 liter of water. The resulting solution was precipitated with acetic acid until a pH of 4–5 is obtained. The mixture was filtered and washed free of chloride ions with cold water and removed as a paste. The resulting product was 4-phenylamino-3-nitrobenzene-N-(3-acetylaphenyl)-sulfonamide with a melting point of 141–143° C. The yield was 133 parts.

An aqueous dye paste was made by mixing 10 lbs. of 4-phenylamino-3-nitrobenzene-N-(3-acetylphenyl)-sulfonamide, 3 lbs. Maraspere N(sodium ligno sulfate) and 17 lbs. water. A fabric sample of an intimate blend of 50% Dacron (polyethylene terephthalate) and 50% cotton was impregnated in baths containing 0.85 to 18.0 oz./gal. dye paste (in 2.0 oz./gal. incremental increases) and 1.0 oz./gal. sodium alginate and squeezed subsequently, between two pad rolls under sufficient pressure to obtain a 50–55% weight increase of the wet fabric. After drying in a hot air oven at 70° C., the fabric was heated in a hot air oven at 200–210° C. for 1–2 minutes to provide a uniformly fixed dye product.

This dyed fabric was then subjected to a reductive steaming operation by passing it through a solution containing 45 grams/l. caustic soda flakes and 30 grams/l. sodium hydrosulfite. This was followed by steaming for 30–45 seconds at 100°–110° C., a cold water rinse and an oxidation treatment consisting of 6 grams/l. sodium bichromate and 7.5 grams/l. glacial acetic acid. A thorough wash was given to remove residual chemicals from the oxidative step.

This dyed product was treated by passing it through a solution containing ½ gallon water, 32 oz. ureaformaldehyde-glyoxal resin (Permafresh 183), 5.76 oz. zinc nitrate solution as a catalyst, 3.88 oz. nonionic polyethylene emulsion (Mykon SF) as a softener, 5.12 oz. nonionic polymer emulsion (Silkhand 40) as a hand modifier, 5.9 oz. acrylic polymer (Rhoplex HA 12) as a builder and 0.32 oz. alkylaryl polyether alcohol (Triton X–100) as a nonionic surfactant. The treated, dyed product was then squeezed between two pad rolls, dried in a hot air oven at 60° C. and cured at 170° C. for 15 minutes to provide a press-free, crease-resistant dyed fabric.

For comparative purposes, this padded dye procedure was repeated using 4-phenylamino-3-nitrobenzene-N-(phenyl)-sulfonamide as a control.

The shade of the resulting padded fabric dyed with the compound of the invention showed a superior incremental strength increase through the higher limit of dye concentration, i.e., superior build properties, as compared with the fabric dyed with the control compound.

The following two sublimation tests were run:

(1) Sublimation of the dye from dyed but untreated shaped article when subjected to 375° F. for one minute between two heated plates (AATCC Test Method 117–1967).
(2) Sublimation of the dye from dyed and resin treated fabric when treated fabric is exposed, as sewed in a sandwich between undyed polyester/cotton fabric on one side and 100% cotton on the other side, to curing temperature of 340° F. for 10 minutes.

For both tests the fabric of the invention was superior to the fabric of the control

EXAMPLE II

The compound of Example I was employed to dye polyethylene terephthalate fiber (Dacron polyester at strengths from 2.0% to 20.0% on weight of fiber) in the following manner. A dye bath in a vessel was prepared at 160° F. to include 15% (on weight of fiber to be dyed) of emulsified biphenyl and sufficient water to be 40 times the weight of fiber to be dyed. The pH of this bath was adjusted to 5.0–5.5 with acetic acid and the fiber was immersed in the bath. The temperature of the bath was raised to a boil at 3° F. per minute and dyeing continued at this temperature for 1 hour. The dyed fiber was rinsed in hot water until clear of color, dried and heat-treated at 365° F. for three minutes.

This carrier dye procedure was repeated using 4-phenylamino-3-nitrobenzene-N-(phenyl)-sulfonamide as a control.

The shade of the resulting carrier dyed fiber with the compound of the invention had superior build properties as compared with the fiber dyed with the control compound. The product of the invention showed a superior incremental strength increase through the higher limit of dye concentration.

Furthermore, the vessel where the compound of the invention was used was essentially free from any color stain at the metal to dyebath interface. In contrast, the vessel where the control compound was used had a noticeable stain.

The first sublimation test described in Example I also was preformed. The fiber of the invention was superior to the control fiber.

EXAMPLE III

The compounds indicated in Table 1 include the dye described in Example I and other dyes which were prepared by the same procedure with the reactants being varied to provide the desired end product. Fabrics were dyed with each of the compounds as described in Example I.

All of the dyed fabrics had excellent fastness to sublimation and had deep shades.

TABLE 1

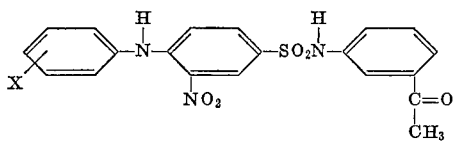

| Dye No. | X-substituent | Shade |
|---|---|---|
| 1 | H | Yellow. |
| 2 | 4-OC$_2$H$_5$ | Reddish-yellow. |
| 3 | 3-OCH$_3$ | Do. |
| 4 | 2-OCH$_3$ | Orange-yellow. |
| 5 | 4-Cl | Greenish-yellow. |

EXAMPLE IV

The compounds listed in Table 2 are compounds that are considered to be suitable dyes. They may be prepared by the same procedure described in Example I by varying the reactant to provide the required end product.

TABLE 2

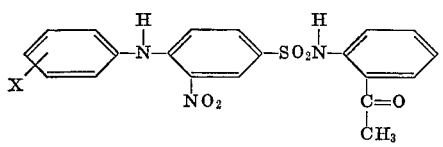

| Dye No.: | X-substituent |
|---|---|
| 6 | 2—CH$_3$ |
| 7 | 3—C$_2$H$_5$ |
| 8 | 4—C$_3$H$_7$ |
| 9 | 2—C$_4$H$_9$ |
| 10 | 3—C$_5$H$_{11}$ |
| 11 | 4—C$_6$H$_{13}$ |
| 12 | 4—OCH$_3$ |
| 13 | 3—OC$_2$H$_5$ |
| 14 | 2—OC$_2$H$_5$ |
| 15 | 4—OC$_3$H$_7$ |
| 16 | 3—OC$_4$H$_9$ |
| 17 | 2—OC$_5$H$_{11}$ |
| 18 | 2—OC$_6$H$_{13}$ |
| 19 | 3—Cl |
| 20 | 2—Cl |
| 21 | 2—Br |
| 22 | 3—Br |
| 23 | 4—Br |
| 24 | 2—F |
| 25 | 3—F |
| 26 | 4—F |

Having set forth the general nature and specific embodiments of the present invention, the true scope is now particularly pointed out in the appended claims.

What is claimed is:

1. A dye compound having the structure:

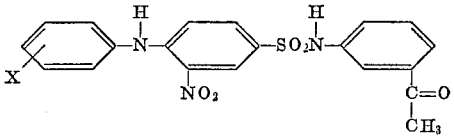

wherein X is hydrogen, halogen, lower alkyl or lower alkoxy.

2. The compound according to claim 1 in which the dye is 4-phenylamino-3-nitrobenzene-N-(3-acetylphenyl)-sulfonamide.

3. The compound according to claim 1 in which the dye is 4 - (4 - ethoxyphenylamino)-3-nitrobenzene-N-(3-acetylphenyl)-sulfonamide.

4. The compound according to claim 1 in which the dye is 4 - (3-methoxyphenylamino)-3-nitrobenzene-N-(3-acetylphenyl)-sulfonamide.

5. The compound according to claim 1 in which the dye is 4 - (2-methoxyphenylamino)-3-nitrobenzene-N-(3-acetylphenyl)-sulfonamide.

6. The compound according to claim 1 in which the dye is 4 - (4 - chlorophenylamino)-3-nitrobenzene-N-(3-acetylphenyl)-sulfonamide.

References Cited

UNITED STATES PATENTS

| | | | |
|---|---|---|---|
| 1,915,334 | 6/1933 | Salzberg et al. | 260—243 |
| 2,075,359 | 3/1937 | Salgberg et al. | 424—250 |
| 2,922,796 | 1/1960 | Adams et al. | 260—397.7 |
| 3,239,543 | 3/1966 | Bement | 260—397.7 |

OTHER REFERENCES

Chem. Abstracts, vol. 63: 16524g, December 1965, Mueller et al.

HENRY R. JILES, Primary Examiner

S. D. WINTERS, Assistant Examiner

U.S. Cl. X.R.

8—179, 17, 21 C, Dig. 4, 115.7; 260—556 B; 134—144

20448

PO-1050
(5/69)

UNITED STATES PATENT OFFICE
CERTIFICATE OF CORRECTION

Patent No. 3,639,670    Dated February 1, 1972

Inventor(s) Andrew Fono and Robert E. Eagle

It is certified that error appears in the above-identified patent and that said Letters Patent are hereby corrected as shown below:

Column 3, line 61, "133" should be --113--;

line 64, "Maraspere" should be --Marasperse--;

Column 6, line 42, "Salgberg" should be --Salzberg--.

Signed and sealed this 20th day of June 1972.

(SEAL)
Attest:

EDWARD M. FLETCHER, JR.          ROBERT GOTTSCHALK
Attesting Officer                Commissioner of Patents